US008221222B2

(12) United States Patent
Inoue

(10) Patent No.: US 8,221,222 B2
(45) Date of Patent: Jul. 17, 2012

(54) GAME SYSTEM, GAME CONTROL METHOD, INFORMATION RECORDING MEDIUM, AND PROGRAM

(75) Inventor: Masahiro Inoue, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 326 days.

(21) Appl. No.: 12/526,903

(22) PCT Filed: Feb. 21, 2008

(86) PCT No.: PCT/JP2008/052939
§ 371 (c)(1),
(2), (4) Date: Aug. 12, 2009

(87) PCT Pub. No.: WO2008/102839
PCT Pub. Date: Aug. 28, 2008

(65) Prior Publication Data
US 2010/0120515 A1    May 13, 2010

(30) Foreign Application Priority Data
Feb. 23, 2007  (JP) ................................. 2007-043158

(51) Int. Cl.
*A63F 9/24* (2006.01)
(52) U.S. Cl. ................... 463/23; 16/24; 16/25; 16/40
(58) Field of Classification Search ............. 463/16, 463/23, 24, 25, 40
See application file for complete search history.

(56) References Cited

U.S. PATENT DOCUMENTS

| 6,773,345 B2 * | 8/2004 | Walker et al. ............. 463/17 |
| 7,384,337 B2 * | 6/2008 | Thomas ..................... 463/27 |
| 7,658,672 B1 * | 2/2010 | Wolf et al. ................. 463/13 |
| 8,002,626 B2 * | 8/2011 | Englman .................... 463/20 |
| 2006/0189376 A1 * | 8/2006 | Hornik et al. ............. 463/20 |
| 2008/0153563 A1 * | 6/2008 | Englman .................... 463/16 |

FOREIGN PATENT DOCUMENTS

| JP | 11-242645 A | 9/1999 |
| JP | 11-319319 A | 11/1999 |
| JP | 2005-160579 A | 6/2005 |
| JP | 2005-323827 A | 11/2005 |

OTHER PUBLICATIONS

International Search Report.
I/O 1998 December Issue ("Network Game Information Center, Play Online!—Let's discover a new recreation with a network playable simulation game") Kohgaku-Sha Co., Ltd., Dec. 1, 1998, vol. 23, 12 issue, pp. 72-73.

* cited by examiner

Primary Examiner — Pierre Eddy Elisca
Assistant Examiner — Shahid Kamal
(74) Attorney, Agent, or Firm — Howard & Howard Attorneys PLLC

(57) ABSTRACT

To provide a game system that makes players' play order comply with a predetermined rule but nevertheless allows, with appropriate measure, any delaying player to join the game, each terminal device constituting the system stores in a storage unit game's stage/delay information regarding all players including players operating other terminal devices, a stage updating unit updates the storage unit based on an operation entry accepted by an operation entry unit from an owner player as a play determining unit determines that the owner player's turn has come, and an operation entry received by an operation receiving unit from any other terminal device, and a delay updating unit updates the storage unit when an abort entry unit accepts an abort entry from the player or an abort notification is received, or updates delay information when stage information is updated.

11 Claims, 7 Drawing Sheets

GAME SYSTEM, GAME CONTROL METHOD, INFORMATION RECORDING MEDIUM, AND PROGRAM

TECHNICAL FIELD

The present invention relates to a game system and a game control method that are suitable for making an order in which players take their turn to play a game to comply with a predetermined rule as much as possible but nevertheless allowing, with an appropriate measure, any player who has fallen behind in play to participate in the game, a computer-readable information recording medium that stores a program for realizing these on a computer, and the program.

BACKGROUND ART

Conventionally, among games played by more than one players, there have been ones that are divided into a plurality of stages, and whose game content progresses when the players conquer each stage by reaching the same goal. Particularly, such a game is often arranged such that the players do their play alternately as much as possible, and that the players stay in the same stage as much as possible.

For example, in darts matches or bowling games, it is common that the players alternate their play as much as possible. Golf games employ a method of prioritizing players whose ball is farther away from the hole to let them play earlier.

In some games in which a plurality of players participate, when a player has to execute him/herself in the middle of the game for some reason, there may need to be some measures to prevent the other players from being disturbed to proceed with the game. For example, in a mah-jongg shop, a shop staff member is available as a substitute player when any player leaves in the middle of the game to take over his/her play.

In addition, a technique for managing such a situation in a network playable game is proposed in, for example, the literature identified below.

Non-Patent Literature 1: I/O 1998 December Issue ("Network Game Information Center, Play Online!—Let's discover a new recreation with a network playable simulation game") Kohgaku-Sha Co., Ltd., Dec. 1, 1998, vol. 23, 12 issue, pp. 72-73)

[Non-Patent Literature 1] proposes a technique that introduces "turn" as a time unit for taking an action (corresponding to "stage" in the above description), requires players to make their game plays within a limited time period at each turn, and puts their issued commands into force all at once when all the players finish their play or when the time limit comes.

There are some games such as mah-jongg and card games, in which a plurality of players participate and that stop outright when one player leaves the game in the middle and aborts the play. On the other hand, in a bowling game, a darts match, a golf game, etc., it is, in principle, not impossible to carry out a game even if a player aborts the play in the middle, if the game is played in a way that each player continues the play at his/her own pace, and the player who has left catches up the play afterwards.

This is especially so in a case where the game score or who wins or loses is determined based on the results that have been produced when some collective number of stages have been finished by all the players, because it is enough if the player who has left in the middle can catch up before the score or the winner or the loser is finalized.

The substitution in a mah-jongg game and the technique disclosed in [Non-Patent Literature 1] are the measures for games of the former type.

On the other hand, in a game of the latter type, it is critical that the players move around in the same place or act in the same place at the same time if it is a real world game, while in a network game, a time lag of some degree may be allowed.

Hence, there is a strong demand for a technique for enabling an overall smooth flow of a game by taking an appropriate measure for a situation, which occurs when there are a plurality of participating players, that one of them has fallen behind the others in play and caused a time lag.

The present invention aims for solving the above problem, and an object of the present invention is to provide a game system and a game control method that are suitable for making a play order of players to comply with a predetermined rule as much as possible but nevertheless allowing, with an appropriate measure, any player who has fallen behind in play to participate in the game, a computer-readable information recording medium that stores a program for realizing these on a computer, and the program.

SUMMARY OF THE INVENTION

To achieve the above object, the following invention will be disclosed in accordance with the principle of the present invention.

A game system according to a first aspect of the present invention includes a plurality of terminal devices, each of which is assigned any of a plurality of players, each of who progresses a game by clearing a plurality of stages in an order. The plurality of terminal devices share a predetermined rule that uniquely determines a play order of the plurality of players.

Hence, once a game is started, each terminal device can identify a play order of the player without inquiring of the other terminal devices. This play order is common to all the terminal devices.

Each of the plurality of terminal devices includes a storage unit, a play determining unit, an operation entry unit, an operation sending unit, an operation receiving unit, a stage updating unit, and a delay updating unit, which are configured as follows.

That is, the storage unit stores, for all of the plurality of players, delay information indicating whether each player is delayed or not, and stage information indicating whether each player has cleared each of the plurality of stages or not.

The stage information indicates to what ordinal number frame a bowling game has been played, to what ordinal number hole a golf game has been completed, or to what ordinal number throw a darts game has been played, etc.

Stages correspond to breakpoints, units, or segments of a game divided into plural parts. It is desired that the players behave while keeping pace with each other. When all the stages are cleared, all players' total achievements or winners or losers are determined. The present invention assumes a game in which play can be established at any given stage even if there is no other player.

The delay information indicates whether or not a player is in a status that he/she has been delayed for some reason and has not yet been able to get back in synchronization with other players.

In addition, the storage unit may store information indicating statues of each player in the game necessary for progressing the game, or information indicating past achievements, etc. As will be described later, the information stored in the storage unit is updated as needed.

In the following explanation, the following terms for classifying the players will be used for facilitating the understanding. That is, when a focus is put on a given terminal device, (1) an "owner player" refers to a player assigned to that terminal device, (2) a "main player" refers to a player for whom the delay information stored in the storage unit of the terminal device indicates that he/she is not delayed, (3) a "sub player" refers to a player for whom the delay information stored in the storage unit of the terminal device indicates that he/she is delayed, (4) "other player" refers to a player who is assigned to a terminal device that has sent an operation notification; other player will be described later, and (5) an "aborting player" refers to a player who is assigned to a terminal device that has sent an abort notification; an aborting player will be described later.

The play determining unit determines whether a play condition of the owner player is satisfied or not, where the play condition is (a) the owner player is a sub player, so the owner player has not cleared some of stages that have been cleared by all main players, or (b) the owner player is a main player, and the owner player is the first in the play order, when the shared predetermined rule is applied to all the main players.

The play condition (a) describes a situation that the owner player has aborted the play for some reason and has not yet got back in synchronization with the main players. This situation can be described in a different way that the stage information stored in the storage unit indicates that some of the stages that have been cleared by all the main players have not yet been cleared by the owner player, who is now a sub player. Hence, in such a situation, the owner player should be set ready to start the play so that he/she can catch up with the main players.

The play condition (b) describes a situation that the owner player has not been delayed and has continued playing keeping pace with the other main players. For example, in a case where four players play a bowling game, they first decide the play order in each frame by paper-rock-scissors, coin tossing, or based on past scores, etc. If a rule is set out that any of them who is delayed is counted out of the play order, any terminal devices that are used by main players can acquire the same play order.

For example, under a rule that four players A, B, C, and D deliver a shot in this order repetitively, when C is delayed, the other three players A, B, and D will repetitively play in this order until C comes back.

When none of A, B, and D has yet played in a current frame, the top player in the play order is A. After A delivers one shot resulting in a strike or delivers two shots, A advances to the next stage and the top player in the play order becomes B. After B delivers one shot resulting in a strike or delivers two shots, B advances to the next stage and the top player in the play order becomes D. After D delivers one shot resulting in a strike or delivers two shots, D advances to the next stage, and the top player in the play order becomes A again. In this way, the play order cyclically changes each time any of the main players advances to the next stage of the game.

The operation entry unit accepts an operation entry from the owner player that is given for a first stage in the order among stages that have not been cleared by the owner player, in a case where it is determined that the play condition of the owner player is satisfied.

As described above, for a main player, the play condition is satisfied when his/her own turn comes, while for a sub player, the player condition is satisfied until he/she catches up with main players. In most cases, there are a plurality of main players and there is one sub players. Hence, a little delay will not hinder the delayed sub player from catching up with the main players, because the sub player and the main players get over their stages at different speeds.

The device that accepts an operation entry may be a game controller, a keyboard, a mouse, a joystick, a foot switch, or the like. Alternatively, three-dimensional location, direction and attitude information of the controller may be used as an operation entry. For example, in a case where the controller is mounted with an accelerometer or in a case where the location or attitude of the controller can be measured based on the time or phase difference required for an infrared ray or an ultrasonic wave to reach the controller, an action of moving the controller around is associated with an action of throwing the bowl for a bowling game or with an action of swinging a golf club, and a value measured from any such action or an appropriately processed result of such a measured value is used as an operation entry.

The operation sending unit sends an operation notification that specifies the accepted operation entry to the other terminal devices of the plurality of terminal devices, and the operation receiving unit receives an operation notification that is sent from any other terminal device of the plurality of terminal devices.

The operation sending unit and the operation receiving unit are paired elements, and they are for notifying the play status of the owner player to the other terminal devices or for being notified of the play status of the player of any other terminal device.

The present invention progresses the game not mainly based on a so-called server-client system, but by placing every terminal device on an equal footing. Success or failure of an operation entry can be determined by every terminal device since they together realize a game. Therefore, all the terminal devices process operation entries of all the players to determine whether or not each of all the players can go to the next stage.

In a case where the present invention is applied to a server-client system, the process performed by the terminals of the present invention may be appropriately skipped.

Accordingly, it is possible to prevent cheating actions to a possible degree, by checking whether the determination results of the respective terminal devices coincide.

The stage updating unit updates the stage information stored in the storage unit. Specifically, (m) in a case where a clearing condition of the first stage in the order among the stages that have not been cleared by the owner player is satisfied by the accepted operation entry, the stage updating unit stores, in the storage unit, information that the owner player has cleared the first stage in the order among the stages that have not been cleared by the owner player, and (n) in a case where a clearing condition of a first stage in the order among stages that have not been cleared by any other player is satisfied by an operation entry specified in the received operation notification, the stage updating unit stores, in the storage unit, information that the any other player has cleared the first stage in the order among the stages that have not been cleared by the any other player.

Any other player refers to a player who is assigned to a terminal device that has sent the operation notification as described above.

A clearing condition is a condition required for climbing up the stages of each game. In the bowling case, a stage (frame) is cleared when a player delivers one shot that makes a strike or delivers two shots. In a darts math case, a stage (throw) is cleared when a player plays one throw (three shots).

In a golf game, it is typical to declare that a stage is cleared when the ball drops in a cup. However, it is also possible to divide the game into more small stages by declaring that a stage is cleared when the ball gets on the green or by declaring that a stage is cleared when the ball drops in the cup on the green.

The above (m) case is for advancing the owner player to the next stage (next frame) when the owner player clears a given stage. The above (n) case is for advancing any other player to the next stage (next frame) when the any other player clears a given stage. In the above (n) case, the any other player may be a main player or may be a sub player.

The delay updating unit updates the delay information stored in the storage unit. Specifically, (p) in a case where, for each sub player, a stage up to which the sub player has cleared and a stage up to which all the main player have cleared are the same, the delay updating unit stores, in the storage unit, information that the sub player is not delayed.

As described above, a sub player, who falls behind the main players, can in many cases catch up with the main players once he/she resumes the play. The above (p) case is for determining whether the sub player has caught up with the main players, and once the sub player has caught up with them, the information is updated to indicate that the player is no longer delayed.

The present invention progresses a game by putting the respective terminal devices on an equal footing, and makes the play order of the players comply with a predetermined rule as much as possible while also allowing, with an appropriate measure, any player who is delayed to participate in the game, without disturbing the play of the players who are not delayed, realizing comfortable game participation for all the players.

In the game system according to the present invention, each of the plurality of terminal devices may further include an abort determining unit, an abort sending unit, and an abort receiving unit, which may be configured as follows.

That is, the abort determining unit determines whether or not the owner player has performed an abort process. The followings can be considered as an abort process.

(A) the terminal device further includes an abort entry unit that accepts an abort entry from the owner player; when an abort entry from the owner player is accepted, it is determined that the owner player has performed an abort process.

(B) in a case where it is determined that the play condition of the owner player is satisfied, and the owner player does not give an operation entry within a predetermined period of time for the first stage in the order among the stages that have not been cleared by the owner player, it is determined that the owner player has performed an abort process.

The above (A) is a manner for expressly entering into the terminal, information that the player is going to leave the game for a guest arrival or a nature's call. An abort entry may be established by pressing of a predetermined switch or selection of a predetermined menu item.

The above (B) corresponds to the case of setting a time limit described in [Non-Patent Literature 1]. However, unlike [Non-Patent Literature 1], the present invention turns the owner player into a sub player when he/she fails to keep a time limit to automatically bring him/her under a status under which he/she progresses the game independently from the main players.

The abort sending unit sends an abort notification to the other terminal devices of the plurality of terminal devices when it is determined that an abort process has been performed, and the abort receiving unit receives an abort notification that is sent from any other terminal devices of the plurality of terminal devices.

The abort sending unit and the abort receiving unit perform paired functions, and they are for notifying to the other terminal devices that the owner player has aborted the play, or for being notified that the player of any other terminal device has aborted the play.

Further, (q) in a case where it is determined that the abort process has been performed, the delay updating unit stores, in the storage unit, information that the owner player is delayed, and (r) in a case where the abort notification is received, the delay updating unit stores, in the storage unit, information that an aborting player is delayed.

An "aborting player" is a player who is assigned to a terminal device that has sent the abort notification, as described above.

The above (q) case is for turning the owner player into a sub player when the owner player aborts the game, and the above (r) case is for turning a player who is assigned to any other terminal device into a sub player when the player aborts the game.

The present invention shifts a player, who leaves the game by expressing to do so or in silence, to a delay status to prevent the game itself from being delayed, and being combined with the above configuration, enables the game to be progressed by all the participants as much as possible by arranging for the delaying sub player to be able to catch up with the non-delaying main players.

Further, in the game system according to the present invention, the play determining unit may be configured to perform its determination when a game is started, when the delay information is updated, or when an operation notification is received.

For example, the golf rule sets out nothing about hitting a tee shot at the starting point of a hole (where the ball is teed up), but provides that after the tee shot, those who are farther away from the hole should play first. Therefore, each time the players hit a shot, it is necessary to decide who is the next player.

An appropriate rule may be set for teeing such that each player's turn is uniquely determined. Such a rule may be to determine the order by a lottery, random numbers, etc. or to arrange players with worse past achievements first in the order, etc. before a game is started.

Hence, the present invention can deal with a game rule in which the play order of the players is neither alternate nor in a predetermined cyclic pattern.

Further, in the game system according to the present invention, the play determining unit may be configured to perform its determination when a game is started, when the delay information is updated, or when the stage information is updated.

For example, darts players alternate their play when each finishes one throw (three arrows). Bowling players alternate their play when each finishes one frame (one shot with a strike, or two shots). Hence, where a cyclic order is set among a plurality of players before a game is started, and one throw or one frame is regarded as a "stage", the timing to determine who is the next player may be when the stage information is updated.

The present invention can deal with a game rule in which the play order of the players is alternate or in a predetermined cyclic pattern.

In the game system according to the present invention, each of the plurality of terminal devices may further include a display unit, which may be configured as follows.

That is, the display unit generates, based on the accepted operation entry or based on the operation entry specified in the received operation notification, an image that is associated with the operation entry, and displays the generated image together with information about the player who has given the operation entry.

The accepted operation entry is given by the owner player and the operation entry specified in the received operation notification is given by any other player. In games of golf, darts, bowling, etc., it is one great pleasure to watch other players playing, not like just playing for oneself.

The present invention can enable each player to view the plays of all the players who participate in a game on his/her own terminal device.

In the game system according to the present invention, the display unit may be configured to (x) display information about the owner player more emphatically than information about any other player, in a case where the owner player is a sub player, and (y) display information about a main player more emphatically than information about a sub player, in a case where the owner player is a main player.

At this time, the display unit may be configured to display an image associated with an operation entry given by a player who should be displayed emphatically in a wider area than an area in which an image associated with an operation entry given by any other player is displayed. The term "wider" here typically means that an image is displayed in enlargement. The method of displaying in a "wider" area is one approach for emphatic display. A method of displaying an image in the center of a screen or in a main window may be used for emphatic display.

The above (x) case describes a situation that the owner player is delayed so it is assumed that he/she is playing in a stage different from the stage played by the main players who are going ahead, and the owner player is playing in the stage alone, so the play of the owner player is emphasized more than the other players.

The above (y) case describes a situation that the owner player is playing as a main player and the plays of the other main players, needless to say about the play of the owner player, are important because the owner player is playing in the same stage as the other main players, so the plays of the main players, one of who is the owner player, are emphasized more than the sub players.

By making a difference between images about whether they are emphasized or not based on the size of the areas in which the images are displayed, it is possible to display, in an overlaying manner, a situation of, for example, a golf tournament hooked up on a television broadcast, where a plurality of notable players might be playing in different holes.

The present invention can present information appropriately to a player, by emphasizing a play of a player who may be considered to be of interest to the player.

A game control method according to another aspect of the present invention is performed by each of a plurality of terminal devices used in a game, each of which is assigned any of a plurality of players, each of who progresses the game by clearing a plurality of stages in an order. The plurality of terminal devices share a predetermined rule that uniquely determines a play order of the plurality of players, and each of the plurality of terminal devices includes a storage unit, a play determining unit, an operation entry unit, an operation sending unit, an operation receiving unit, a stage updating unit, and a delay updating unit. The storage unit stores, for all of the plurality of players, delay information indicating whether each player is delayed or not, and stage information indicating whether each play has cleared each of the plurality of stages or not. The method includes a play determining step, an operation entry step, an operation sending step, an operation receiving step, a stage updating step, and a delay updating step, which are configured as follows.

That is, at the play determining unit, the play determining unit determines whether a play condition of the player assigned to the terminal device (hereinafter referred to as "owner player") is satisfied or not, where the play condition is (a) the owner player is a player indicated in the stored delay information as being delayed (hereinafter referred to as "sub player"), so the owner player has not cleared some of stages that have been cleared by all such players who are indicated in the stored delay information as not being delayed (hereinafter such a player will be referred to as "main player"), or (b) the owner player is a main player, and the owner player is first in the play order when the shared predetermined rule is applied to all main players;

At the operation entry step, in a case where it is determined that the play condition of the owner player is satisfied, the operation entry unit accepts an operation entry from the owner player that is given for a first stage in the order among stages that have not been cleared by the owner player.

At the operation sending step, the operation sending unit sends an operation notification that specifies the accepted operation entry to the other terminal devices of the plurality of terminal devices.

At the operation receiving step, the operation receiving unit receives an operation notification that is sent from any other terminal device of the plurality of terminal devices.

At the stage updating step, the stage updating unit updates the stage information stored in the storage unit. Specifically, (m) in a case where a clearing condition of the first stage in the order among the stages that have not been cleared by the owner player is satisfied by the accepted operation entry, the stage updating unit stores, in the storage unit, information that the owner player has cleared the first stage in the order among the stages that have not been cleared by the owner player, and (n) in a case where a clearing condition of a first stage in the order among stages that have not been cleared by a player assigned to a terminal device that has sent the received operation notification (hereinafter this player will be referred to as "any other player") is satisfied by an operation entry specified in the received operation notification, the stage updating unit stores, in the storage unit, information that the any other player has cleared the first stage in the order among the stages that have not been cleared by the any other player.

At the delay updating step, the delay updating unit updates the delay information stored in the storage unit. Specifically, (p) in a case where, for each sub player, a stage up to which the sub player has cleared and a stage up to which all the main players have cleared are the same, the delay updating unit stores, in the storage unit, information that the sub player is not delayed.

A program according to another aspect of the present invention controls a computer to function as each unit of the terminal devices of the game system described above.

The program according to the present invention may be recorded on a computer-readable information recording medium such as a compact disk, a flexible disk, a hard disk, a magneto-optical disk, a digital video disk, a magnetic tape, a semiconductor memory, etc.

The program described above may be distributed or sold through a computer communication network, independently from a computer that executes the program. The information recording medium described above may be distributed or sold independently from a computer.

According to the present invention, it is possible to provide a game system and a game control method that are suitable for making a play order of players to comply with a predetermined rule as much as possible but nevertheless allowing, with an appropriate measure, any player who has fallen behind in play to participate in the game, a computer-readable information recording medium that stores a program for realizing these on a computer, and the program.

Figure 1:
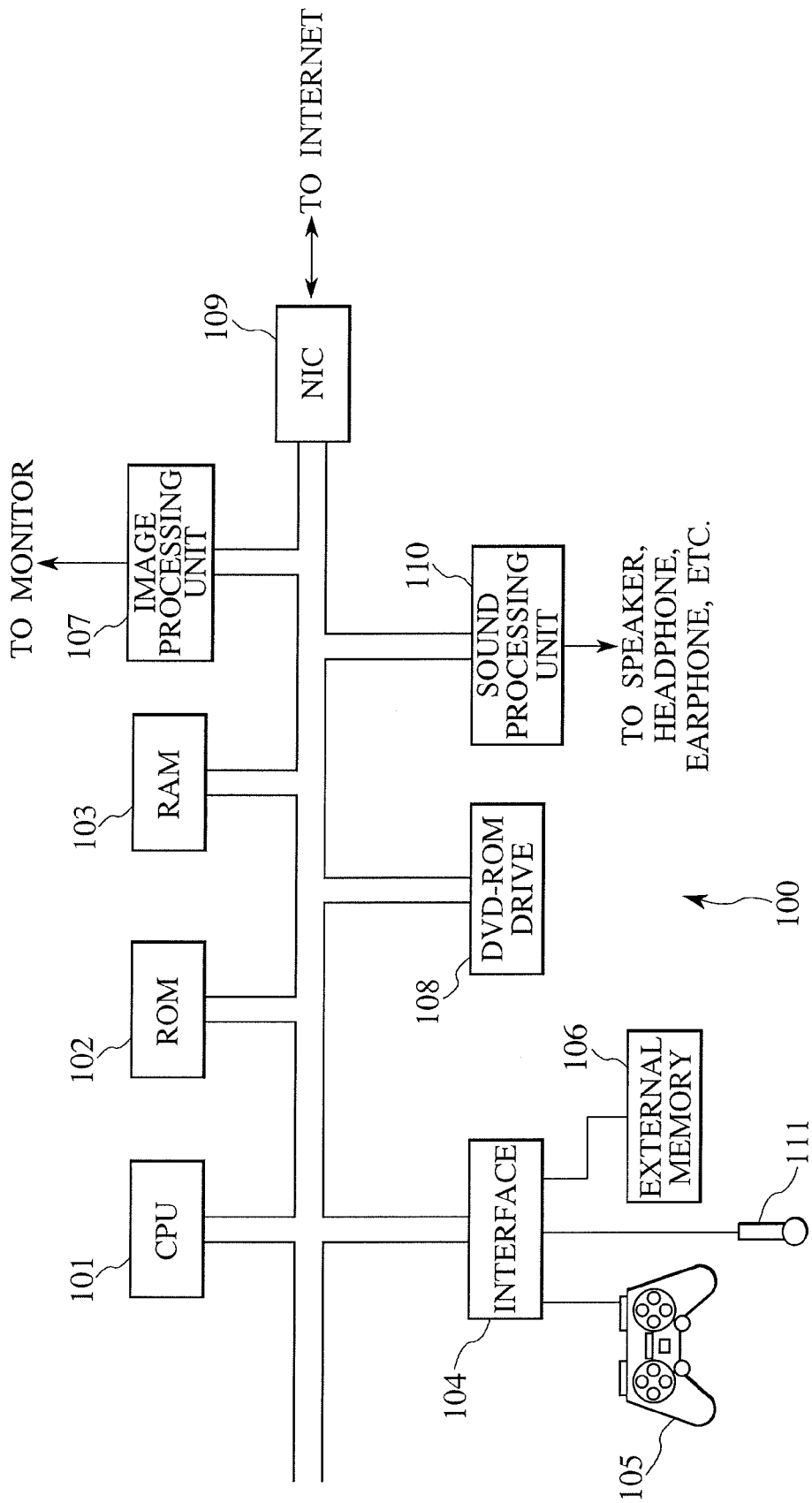
FIG. 1 is an exemplary diagram showing a schematic configuration of a typical information processing device that serves, by executing a program, functions of a terminal device in a game system according to the present invention.

EXPLANATION OF REFERENCE NUMERALS 100 information processing device
101 CPU
102 ROM
103 RAM
104 interface
105 controller
106 external memory
107 image processing unit
108 DVD-ROM drive
109 NIC
110 sound processing unit
111 microphone
201 game system
202 terminal device
203 Internet
301 storage unit
302 play determining unit
303 operation entry unit
304 operation sending unit
305 operation receiving unit
306 stage updating unit
307 delay updating unit
308 abort determining unit
309 abort sending unit
310 abort receiving unit
311 abort entry unit
312 display unit
901 screen
902 character emphatic display area
903 player information emphatic display area
904 character normal display area
905 player information normal display area

DETAILED DESCRIPTION OF THE INVENTION

Embodiments of the present invention will now be explained below. For easier understanding, embodiments in which the present invention is embodied with the use of an information processing device for games will be explained below, but the embodiments explained below are intended for illustration, not to limit the scope of the present invention. Hence, although those skilled in the art could employ embodiments obtained by replacing individual components or all the components of the embodiments below with equivalents of those, such embodiments will also be included in the scope of the present invention.

Embodiment 1

FIG. 1 is an exemplary diagram showing a schematic configuration of a typical information processing device that serves the functions of a terminal device in a game system according to the present invention. The following explanation will be given with reference to FIG. 1.

The information processing device 100 includes a Central Processing Unit (CPU) 101, a ROM 102, a Random Access Memory (RAM) 103, an interface 104, a controller 105, an external memory 106, an image processing unit 107, a Digital Versatile Disc ROM (DVD-ROM) drive 108, a Network Interface Card (NIC) 109, a sound processing unit 110, and a microphone 111.

When a DVD-ROM that stores a game program and data is inserted to the DVD-ROM drive 108 and the information processing device 100 is turned on, the program is executed and an image generating device according to the present embodiment is realized.

The CPU 101 controls the entire operation of the information processing device 100, and is connected to each component to exchange control signals and data with it. The CPU 101 can perform arithmetic operations such as addition, subtraction, multiplication, division, etc., logical operation such as logical addition, logical multiplication, logical negation, etc., and bit operations such as bitwise OR, bitwise AND, bit inversion, bit shift, bit rotation, etc., by working an Arithmetic Logic Unit (ALU) (unillustrated) on a register (unillustrated), which is a storage area that can be accessed at a high speed. Furthermore, the CPU 101 may by itself be configured to be able to perform saturate calculates such as addition, subtraction, multiplication, division, etc., trigonometric functions, vector operations, etc. to deal with multimedia processing, or may realize these operations with a coprocessor.

An Initial Program Loader (IPL), which is executed immediately after the power is turned on, is stored in the ROM 102, and when executed, makes a program stored on a DVD-ROM be read into the RAM 102 and executed by the CPU 101. Further, an operating system program and various data that are necessary for controlling the operation of the whole information processing device 100 are stored in the ROM 102.

The RAM 103 is a temporary memory for data and programs, and retains programs and data read out from a DVD-ROM and data necessary for game proceeding and chat communications. The CPU 101 secures a variable area in the RAM 103, and performs such processes as performing operations by directly working the ALU on the value stored as the variable, or once storing the value stored in the RAM 102 to a register to perform calculations toward the register and writing back the calculation result to the memory.

The controller 105 connected via the interface 104 receives an operation entry given by a user for playing a game.

The external memory 106 detachably connected via the interface 104 rewritably stores data representing a play status of a game, etc. (past achievements, etc.), data representing a progress status of a game, log (record) data of chat communication for network matches, etc. As needed, a user can record such data onto the external memory 106 by giving an instruction entry via the controller 105.

A DVD-ROM to be mounted on the DVD-ROM drive 108 stores a program for realizing a game and image data and sound data that accompany the game. Under the control of the CPU 101, the DVD-ROM drive 108 performs a reading process to the DVD-ROM mounted thereon to read out a necessary program and data, which are to be temporarily stored on the RAM 103, etc.

The image processing unit 107 processes data read out from a DVD-ROM by means of the CPU 101 and an image calculation processor (unillustrated) provided for the image processing unit 107, and records the processed data in a frame memory (unillustrated) provided for the image processing unit 107. Image information recorded on the frame memory is converted to a video signal at a predetermined synchronization timing and output to a monitor (unillustrated) connected to the image processing unit 107. This enables various types of image display.

The image calculation processor can quickly perform overlay calculation of two-dimensional images, transparency calculation such as cc blending, etc., and various saturation calculations.

The image calculation processor can also perform rendering of polygon information arranged in a virtual three-dimensional space and affixed with various texture information by Z buffering to obtain a rendered image of the polygon arranged in the virtual three-dimensional space as seen panoramically from a predetermined view position toward a predetermined direction of sightline.

Furthermore, the CPU 101 and the image calculation processor can in cooperation depict a string of letters as a two-dimensional image in the frame memory or on a surface of any polygon according to font information that defines the shape of the letters.

The NIC 109 connects the information processing device 100 to a computer communication network (unillustrated) such as the Internet, etc. The NIC 109 is constituted by a 10BASE-T/100BASE-T product used for building a Local Area Network (LAN), an analog modem, an Integrated Services Digital Network (ISDN) modem, or an Asymmetric Digital Subscriber Line (ADSL) modem for connecting to the Internet via a telephone line, a cable modem for connecting to the Internet via a cable television line, or the like, and an interface (unillustrated) that intermediates between any of these and the CPU 101.

The sound processing unit 110 converts sound data read out from a DVD-ROM into a sound signal and outputs it from a speaker (unillustrated) connected thereto. Further, under the control of the CPU 101, the sound processing unit 110 generates a sound effect or a music data that should be released in the progress of a game, and outputs sounds corresponding to the data from the speaker.

In a case where sound data recorded on a DVD-ROM is MIDI data, the sound processing unit 110 refers to sound source data held by the MIDI data to convert the MIDI data into PCM data. In a case where sound data recorded on a DVD-ROM is sound data compressed in ADPCM form, Ogg Vorbis form, or the like, the sound processing unit 110 decompresses the data and converts it into PCM data. The sound processing unit 110 Digital/Analog (D/A) converts the PCM data at a timing corresponding to the sampling frequency of the data and outputs it to the speaker, thereby enabling sound output.

The microphone 111 can also be connected to the information processing device 100 via the interface 104. In this case, the information processing device 100 A/D converts an analog signal from the microphone 111 at an appropriate sampling frequency into a digital signal in PCM form so that the sound processing unit 110 can process the signal by mixing, etc.

Furthermore, the information processing device 100 may use a large capacity external storage device such a hard disk or the like and configure it to serve the same function as the ROM 102, the RAM 103, the external memory 106, a DVD-ROM mounted on the DVD-ROM drive 108, or the like.

The information processing device 100 explained above is a so-called "video game apparatus for consumer use", but the present invention can be realized by any apparatus that performs image processing for enabling virtual space displaying. Hence, the present invention can be realized on various computers such as cellular phone, portable game apparatus, karaoke machine, ordinary business-use computer, etc.

For example, an ordinary computer includes, likewise the information processing device 100 described above, a CPU a RAM, a ROM, a DVD-ROM drive, and an NID, an image processing unit with simpler capabilities than those of the information processing device 100, and a hard disk as its external storage device with also compatibility with a flexible disk, a magneto-optical disk, a magnetic tape, etc. Such a computer uses a keyboard, a mouse, etc. instead of the controller 105 as its input device.

Figure 2:
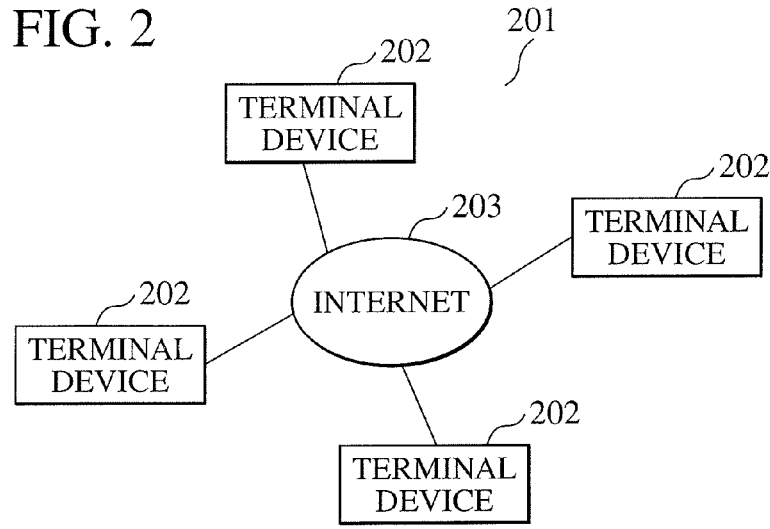
FIG. 2 is an explanatory diagram showing a schematic configuration of a game system according to the present embodiment as a whole.

FIG. 2 is an explanatory diagram showing a schematic configuration of the entire game system according to the present embodiment. The following explanation will be given with reference to FIG. 2.

In a game system 201 according to the present embodiment, information processing devices 100 that function as a terminal device 202 are connected via the Internet 203 and the terminal devices 202 can communicate with each other.

These terminal devices 202 are introduced to each other via a pre-provided lobby server device, and notified of the other's communication identifier (IP address or the like) from the lobby server device so that they can communicate one to one. A plurality of terminal devices 202 participate in one game. The terminal devices 202 may communicate with each other ad hoc via, e.g., wireless communication, not via the Internet 203.

Each of the plurality of terminal devices 202 is assigned any of a plurality of players with no double.

Typical games that are provided by the game system 201 are games such as darts, bowling, golf, etc. that can essentially be established as a game even with only one player participating, but that can be played by each player in the same manner when played by more than one players.

Each of the plurality of players proceeds with the game by clearing a plurality of stages in turn.

A stage corresponds to bowling's frame, golf's hole, and darts' throw respectively. For example, a bowling game is established by ten frames (ten stages), and a golf game is established by eighteen holes (eighteen stages).

The plurality of terminal devices 202 share a predetermined rule that uniquely determines an order in which the plurality of players do their play. Accordingly, once the game is started, each terminal device 202 can identify the play order of the player or whether or not the player's order that is assigned to his/her terminal device 202 has come without inquiring of any other terminal device 202, and the content of the order is common throughout all the terminal devices 202.

Figure 3:
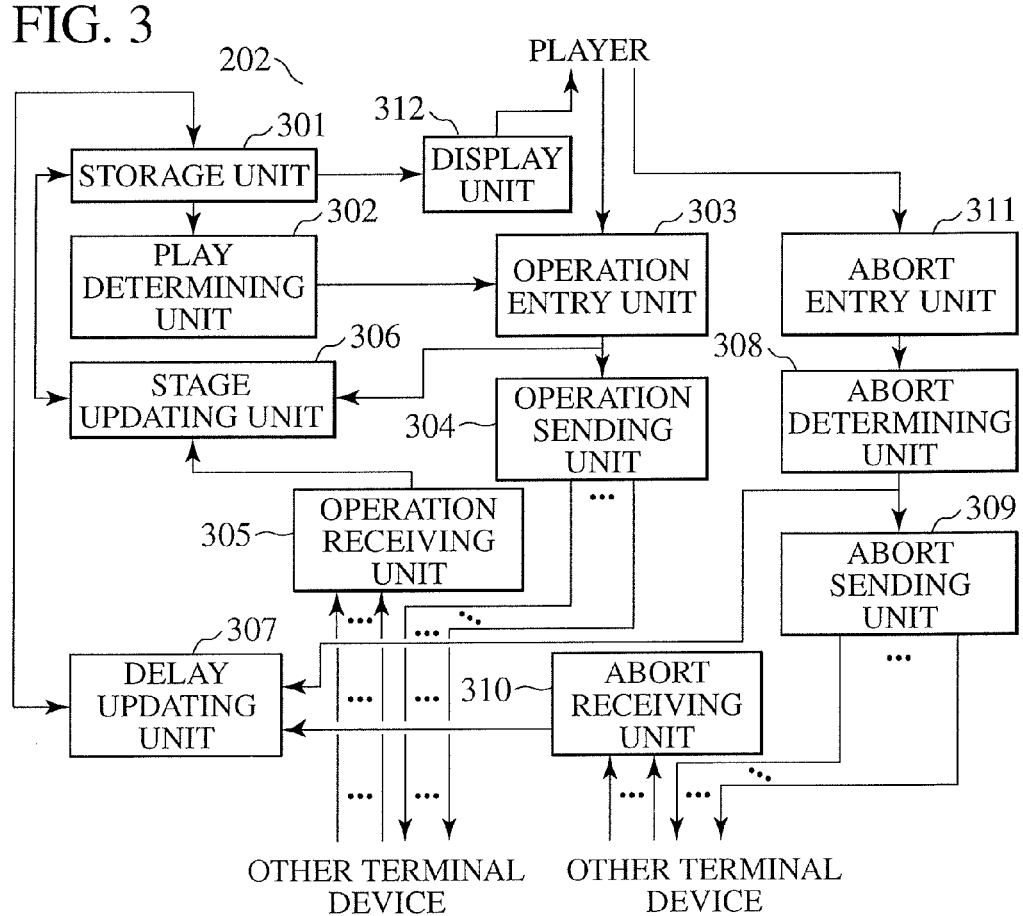
FIG. 3 is an explanatory diagram showing a schematic configuration of a terminal device according to the present embodiment.
Figure 4:
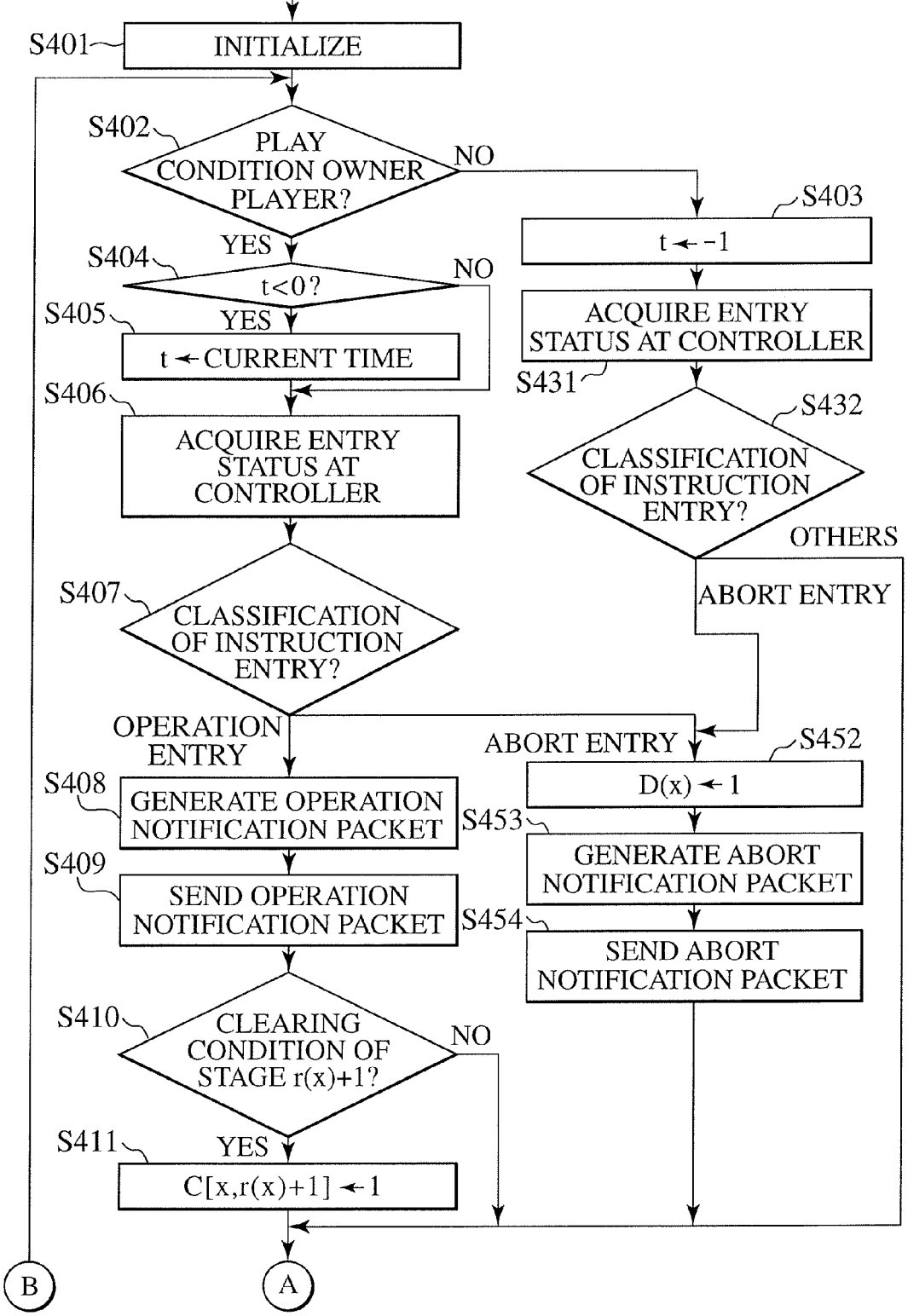
FIG. 4 is a flowchart showing a flow of control of a game process performed by the terminal device according to the present embodiment.
Figure 5:
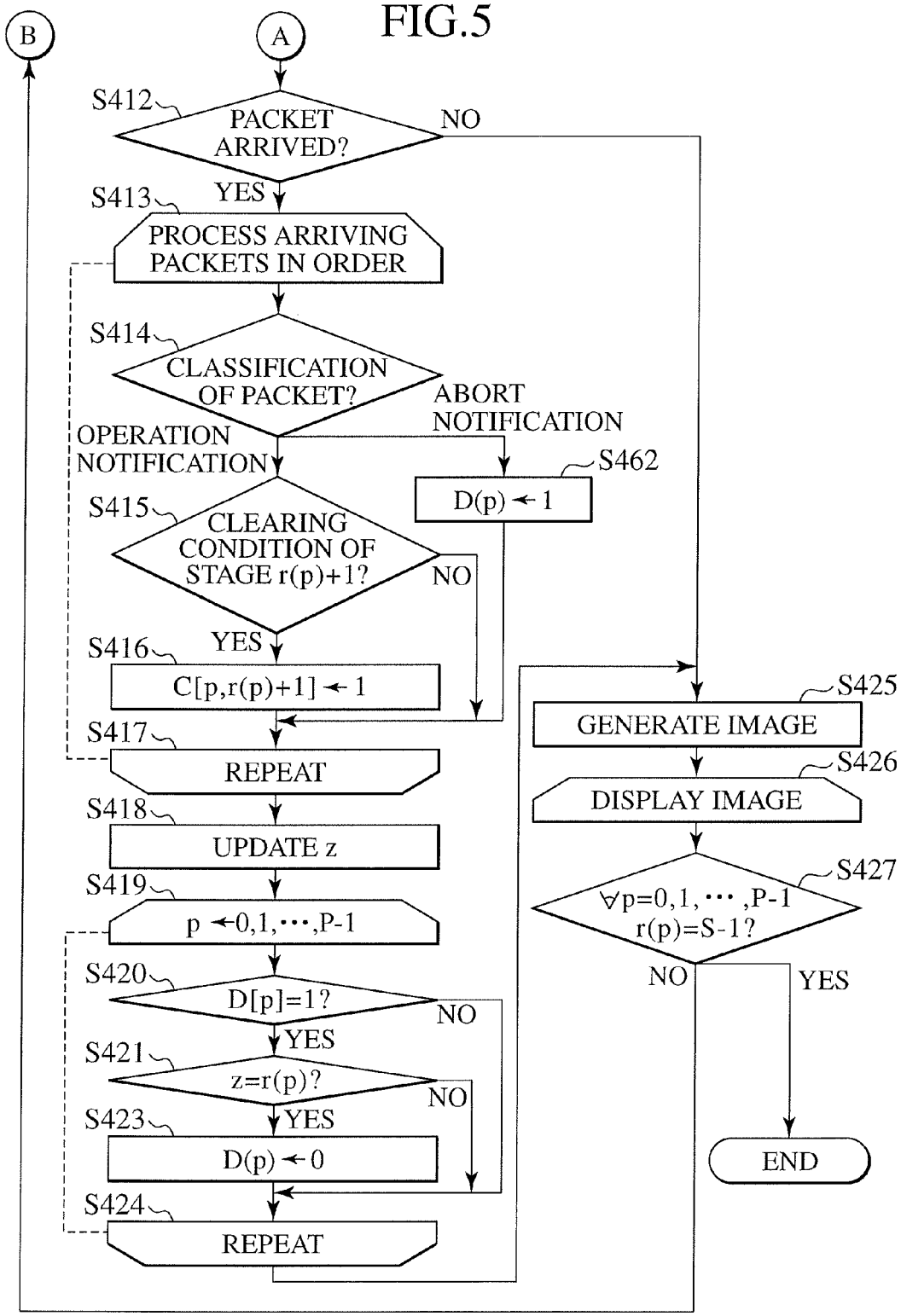
FIG. 5 is a flowchart showing a flow of control of the game process performed by the terminal device according to the present embodiment.

FIG. 3 is an explanatory diagram showing a schematic configuration of the terminal device according to the present embodiment, and FIG. 4 and FIG. 5 are flowcharts showing the flow of control of a game process executed by the terminal device according to the present embodiment. The following explanation will be given with reference to these diagrams.

The terminal device 202 according to the present embodiment includes a storage unit 301, a play determining unit 302, an operation entry unit 303, an operation sending unit 304, an operation receiving unit 305, a stage updating unit 306, a delay updating unit 307, an abort determining unit 308, an abort sending unit 309, an abort receiving unit 310, an abort entry unit 311, and a display unit 312.

The storage unit 301 stores the following information.

First, delay information for all of the plurality of players that indicates whether each player is delayed or not. The delay information indicates whether or not a given player is in a situation of having been delayed for some reason and unable yet to get back in synchronization with the other players in play. Typically, this information is stored in a one-dimensional array D subscripted with a player number "p". In the following explanation, D[p] denotes a delay information element that indicates whether or not a player of a player number "p" is delayed or not. That is, in a case where D[p]=1, the player of the player number "p" is delayed, and in a case where D[p]=0, the player of the player number "p" is not delayed.

In the following explanation, it is assumed that the total number of players is P, and their player number is any of 0, 1, . . . , and P−1.

Second, stage information for all of the plurality of players that indicates whether or not each player has cleared each of a plurality of stages. This information indicates to what ordinal number frame a bowling game has been played, or to what ordinal number hole a golf game has been completed, or to what ordinal number throw a darts match has been played. Typically, this information is stored in a two-dimensional array C subscripted with a player number "p" and a stage number "s". In the following explanation, C[p, s] denotes a stage information element that indicates whether or not a player of a player number "p" has cleared a stage of a stage number "s". that is, in a case where C[p, s]=1, the player of a player number "p" has cleared the stage of a stage number "s", and in a case where C[p, s]=0, the player of a player number "p" has not cleared the stage of a stage number "s".

In the following explanation, it is assumed that the total number of stages is S, and their stage number is any of 0, 1, . . . , and S−1.

When a game process is started, the terminal device 202 performs various initializations (step S401). These initializations include acquisition of the communication identifiers of the other terminal devices 202 that are to participate in the game, initialization of the storage unit 301 by storing predetermined data therein, confirmation for checking whether the content in the storage unit 301 is the same as that in the other terminal devices 202, etc., which are the same as processes performed in general network playable games.

It is typical here to store delay information that indicates that none of the players has been delayed and stage information that indicates that none of the stages has been cleared by any player. In the above denotation manner, all the elements of C and D are initialized to 0. It is possible to employ an embodiment of saving a previous play in the middle and loading the previous play to allow the sequel to be played.

In addition, the RAM 103 has an area for storing a current time and a play start time "t" at which the player who plays on this device starts the play. Here, the value setting is arranged such that in a case where t<0, now is not the player's turn to play, and in a case where t≧0, now is the player's turn to play.

Unlike the storage unit 301, the play start time "t" takes different values in different terminal devices 202. Values stored in the storage unit 301 are global variables or shared variables while the play start time "t" can be considered to be a local variable or a local parameter. The play start time "t" is set to a negative value at the time of initialization.

Hence, the RAM 103 functions as the storage unit 301.

In addition, the storage unit 301 stores other information such as information indicating a game status of each player necessary for proceeding with the game, past achievements, etc. Information to be stored can be appropriately changed according to the content of games.

As will be described later, the information stored in the storage unit 301 is updated as needed. The contents stored in the storage units 301 of the respective terminal devices 202 at a given time point are the same unless any updating delay due to a communication delay is counted.

The predetermined rule that determines the play order is identified with reference to the delay information, the stage information, and the other information stored in the storage unit 301. Since the same content is stored in the storage units 301 of the respective terminal devices 202 as described above, the play order determined based on the predetermined rule naturally becomes the same in the respective terminal devices 202.

In the following explanation, the following terms for classifying the players will be used for facilitating the understanding. That is, when a focus is put on a given terminal device 202, (1) an "owner player" refers to a player assigned to that terminal device 202; in the following explanation, the owner player will be explained with a player number (2) a "main player" refers to a player for whom the delay information stored in the storage unit 301 of the terminal device 202 indicates that he/she is not delayed; where a main player has a player number "p", D[p]=0 is satisfied, (3) a "sub player" refers to a player for whom the delay information stored in the storage unit 301 of the terminal device 202 indicates that he/she is delayed; where a sub player has a player number "p", D[p]=1 is satisfied, (4) "other player" refers to a player who is assigned to a terminal device 202 that has sent an operation notification; an operation notification and other player will be described later, and (5) an "aborting player" refers to a player who is assigned to a terminal device 202 that has sent an abort notification; an abort notification and an aborting player will be described later.

Every player is a main player or a sub player at a given time point.

When the initializations are completed, the play determining unit 302 refers to the information stored in the storage unit 301 and determines whether play conditions of the owner player are satisfied or not (step S402).

The play conditions are specifically as follows.

(a) the owner player is a sub player so the owner player has not yet cleared some of the stages that have been cleared by all the main players, or (b) the owner player is a main player, and the owner player is the first in the play order when the shared predetermined rule is applied to all the main players.

The play condition (a) describes a situation that the owner player has aborted the play for some reason and has not yet got back in synchronization with the main players. This situation can be described in a different way that the stage information stored in the storage unit 301 indicates that some of the stages that have been cleared by all the main players have not yet been cleared by the owner player, who is now a sub player. Hence, in such a situation, the owner player should be set ready to start the play so that he/she can catch up with the main players.

The play determining unit 302 can determine whether the owner player "x" is a sub player or not based on whether $D[x]=1$ is satisfied or not.

Since this game stands on a basis that the stages should be cleared in the order of the stage numbers, a reached stage number r(p), which indicates to what ordinal number stage the player of the player number "p" has reached, can be calculated by the following procedure.

Figure 6:
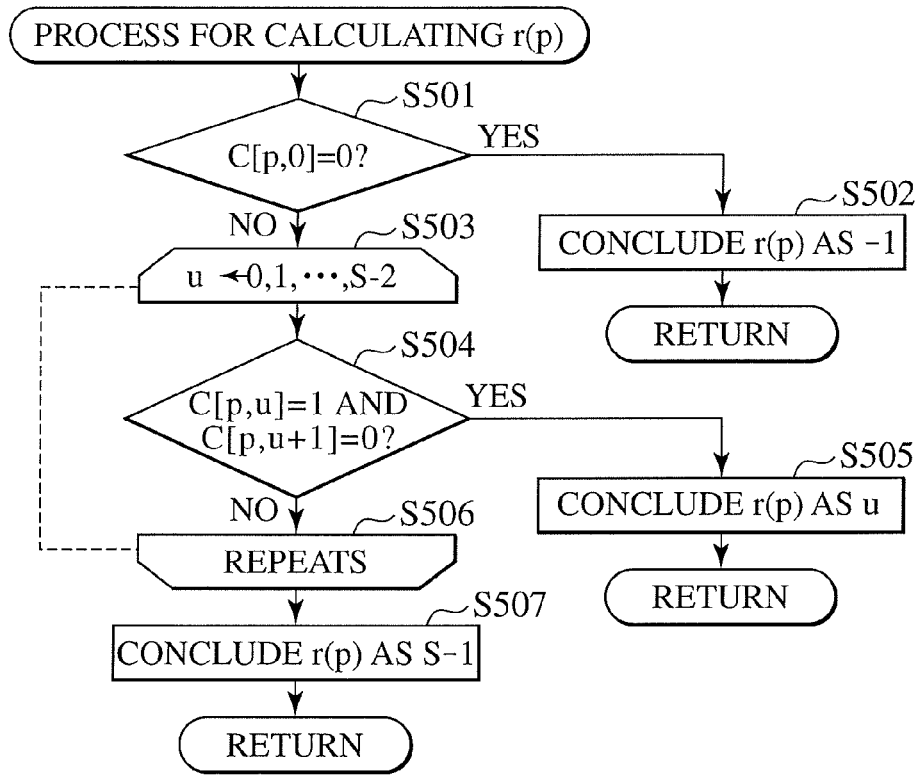
FIG. 6 is a flowchart showing a flow of control of a process for calculating a reached stage number r(p).

FIG. 6 is a flowchart showing the flow of control of a process for calculating the reached stage number r(p). The following explanation will be given with reference to FIG. 6.

First, the play determining unit 302 determines whether $C[p,0]=0$ is satisfied or not (step S501), and if it is satisfied (step S501; Yes), concludes r(p) as $-1$ (step S502), and terminates the process and returns.

If $C[p, 0] \neq 0$ is satisfied (step S501; No), the play determining unit 302 repeats the following process while sequentially substituting $0, 1, \ldots, S-2$ for a variable "u" in the order of smaller ones of these substitutive values (steps S503, S504, S506).

That is, the play determining unit 302 determines whether or not $C[p, u]=1$ and $C[p, u+1]=0$ are both satisfied at the same time (step S504), and if so (step S504; Yes), concludes r(p) as "u" (step S505), and terminates the process and returns.

If not (step S504; No), the play determining unit 302 goes to the next "u" value and repeats the process from step S503 (step S506).

The repetition of steps S503 to S506 should ultimately end with a result of $C[p, S-1]=1$, so the play determining unit 302 concludes r(p) as $S-1$ (step S507), terminates the process and returns.

Since the value of r(p) once calculated will not change until the storage unit 301 is updated, it may be cached or memorized in the RAM 103 as needed.

The play determining unit 302 can calculate the stage up to which the owner player "x" has cleared based on r(x).

Meanwhile, the play determining unit 302 can calculate the stage "z" up to which all the main players have cleared in the following manner.

Figure 7:
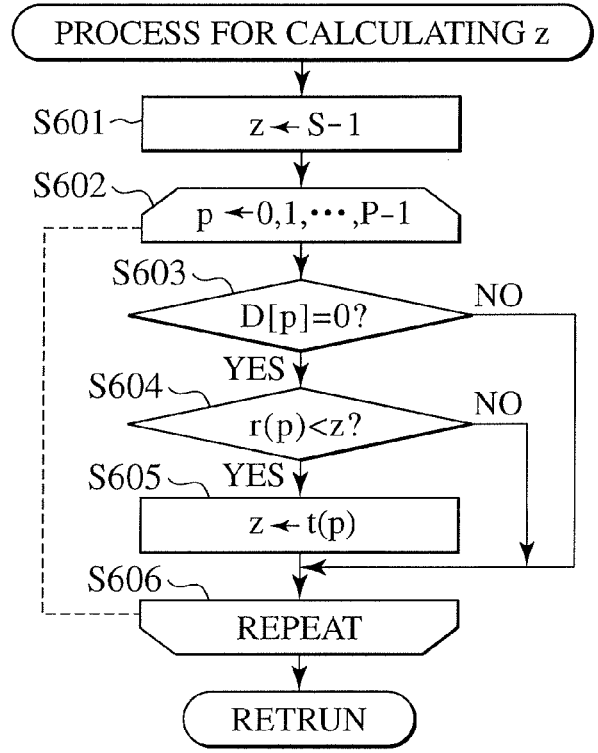
FIG. 7 is a flowchart showing a flow of control of a procedure for calculating a stage "z" up to which all main players have cleared.

FIG. 7 is a flowchart showing the flow of control of a procedure for calculating the stage "z" up to which all the main players have cleared. The following explanation will be given with reference to FIG. 7. Note that "z" is stored in a variable area prepared in the RAM 103.

When the process is started, the play determining unit 302 initializes the variable "z" to $S-1$ (step S601).

The play determining unit 302 repeats the following process while sequentially substituting $0, 1, \ldots, P-1$ for a variable "p" (steps S602 to S606).

First, the play determining unit 302 determines whether the player "p" is a main player or not, i.e., whether $D[p]=0$ is satisfied or not (step S603). If so (step S603; Yes), the play determining unit 302 determines whether $r(p)<z$ is satisfied or not (step S604). If so (step S604; Yes), the play determining unit 302 substitutes r(p) for z (step S605).

Then, the play determining unit 302 goes to the next "p" value and repeats the process from step S602 (step S606).

On the other hand, if $D[p]=0$ is not satisfied (step S603; No), or if $r(p)<z$ is not satisfied (step S604; No), the play determining unit 302 goes to step S606.

When the repetition of steps S602 to S606 is completed, a maximum value possible is stored in the variable "z" as the stage number of the stage up to which all the main players have cleared. Thus, the play determining unit 302 terminates this process.

Since the "z" value once calculated will not change until the storage unit 301 is updated, it is fine enough if the "z" value is calculated once each time the storage unit 301 is updated.

Accordingly, the maximum stage number that indicates the stage up to which all the main players have cleared is "z", and the maximum stage number that indicates the stage up to which the owner player "x" has cleared is r(x). Therefore, the play determining unit 302 can determine whether or not there are some stages that have not been cleared by the owner player among the stages that have been cleared by all the main players, based on whether $z>r(x)$ is satisfied or not.

In a case where $z \leq r(x)$ is satisfied, this indicates that the owner player who had been delayed has caught up with the main players (or as the case may be, has got ahead of some main players).

Meanwhile, the play condition (b) describes a situation that the owner player has not been delayed and has continued playing keeping pace with the other main players. This is the case where $D[x]=0$ is satisfied.

For example, in a case where four players play a bowling game, they first decide the play order in each frame by paper-rock-scissors, coin tossing, or based on past scores, etc. If a rule is set out that any of them who is delayed is counted out of the play order, any terminal devices that are used by main players can acquire the same play order.

For example, under a rule that four players A, B, C, and D deliver a shot in this order repetitively, when C is delayed, the other three players A, B, and D will repetitively play in this order until C comes back.

When none of A, B, and D has yet played in a current frame, the top player in the play order is A. After A delivers one shot resulting in a strike or delivers two shots, A advances to the next stage and the top player in the play order becomes B. After B delivers one shot resulting in a strike or delivers two shots, B advances to the next stage and the top player in the play order becomes D. After D delivers one shot resulting in a strike or delivers two shots, D advances to the next stage, and the top player in the play order becomes A again. In this way, the play order cyclically changes each time any of the main players advances to the next stage of the game.

Figure 8:
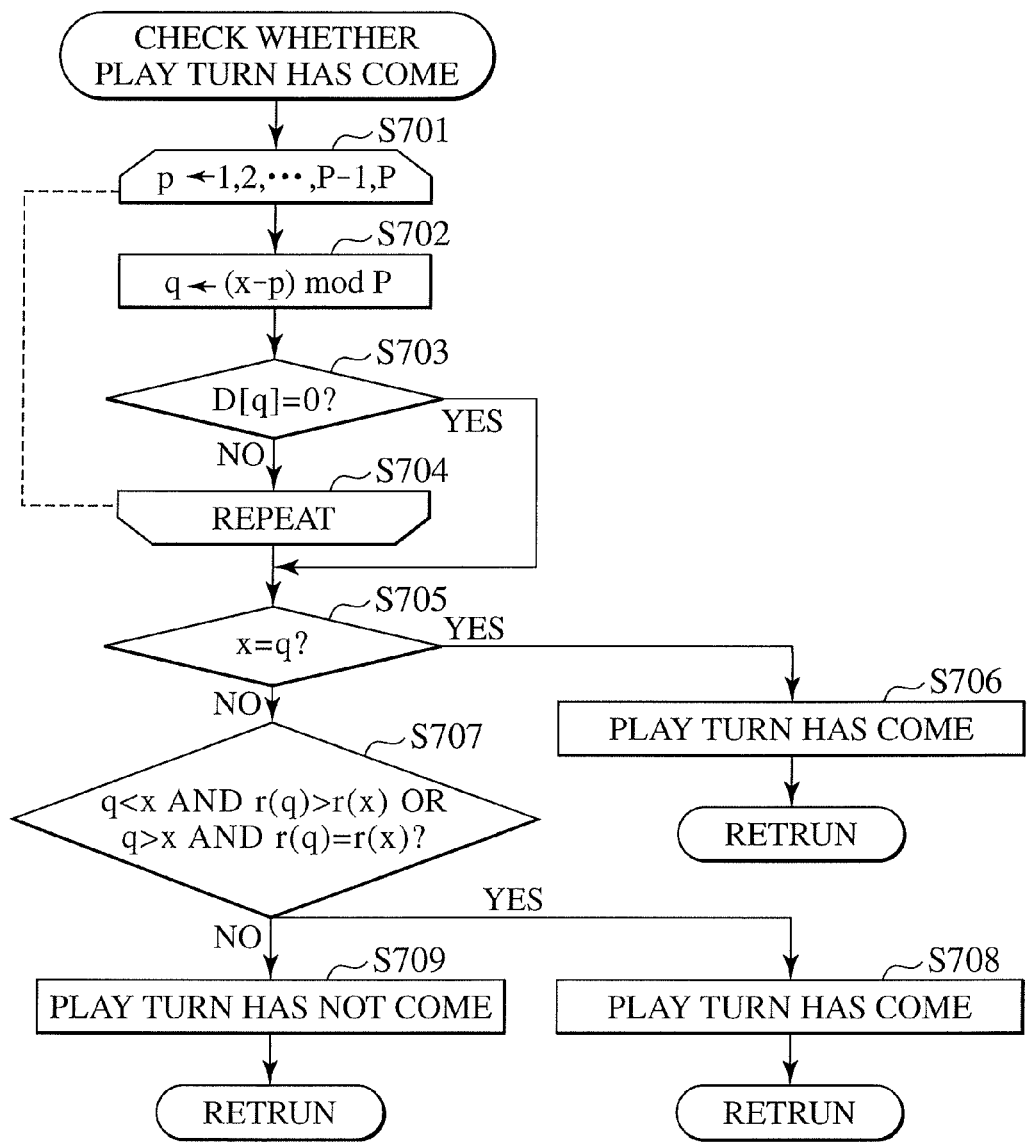
FIG. 8 is a flowchart showing a flow of control of a process for determining, in a case where an owner player is a main player, whether or not the owner player is the top in a current play order, i.e., whether or not the owner player's turn has come.

Various such cyclic rules can be thought up. Among such ones, a case of the main players going for their play in the order of their player numbers will be taken up as an example. FIG. 8 is a flowchart showing a flow of control of a process for determining, in a case where the owner player is a main player, whether the owner player is the top in the current play order, i.e., whether now is the owner player's turn or not. The following explanation will be given with reference to FIG. 8.

First, the play determining unit 302 repeats the following process while sequentially substituting $1, 2, \ldots, P-1$, and P for a variable "p" in the order of smaller ones (steps S701 to S704). The variable "p" here indicates a "player who is ahead of the owner player by "p" persons".

First, the play determining unit 302 calculates the player number "q" of the player who is ahead of the owner player (step S702). That is, the play determining unit 302 performs q←(x−p) mod P. Here, a mod b indicates a remainder resulting from dividing an integer "a" by a positive integer "b". In a case where "a" is negative, the obtained remainder is equal to (a+b) mod b.

For example, in a case where p=1, "q" is equal to (x−1) in most cases (in a case where v≧1). Hence, the player having a player number "q" is the player who is ahead of the player having the player number "x" by one person.

Since the play order is cyclic, the player who is ahead of the player having the player number 0 by one person is the player having the player number P−1, i.e., the last player. In a case where x=0, "q" is calculated to be (0−1) mod P=(−1) mod P=(P−1) mod P=P−1.

Next, the play determining unit 302 determines whether the player "q" is a main player or not, i.e., whether D[q]=0 is satisfied or not (step S703). If so (step S703; Yes), the player "q" is a main player who is immediately ahead of the owner player.

Therefore, the play determining unit 302 gets out of the repetition of steps S701 to S704. On the other hand, if not (step S703; No), the play determining unit 302 goes to the next "p" value and repeats the process of steps S701 to S704 (step S704).

Through this repetition, the play determining unit 302 finds out a main player "q" who is immediately ahead of the main player "x". In most cases, there exist a plurality of main players, so x≠q is satisfied. However, in a case where the player having the player number "x" is the only main player, it turns out that x=q is satisfied, when the variable "p" has taken all its values until it becomes p=P.

Upon getting out of the repetition, the play determining unit 302 determines whether x=q is satisfied or not (step S705). In a case where x=q is satisfied (step S705; Yes), i.e., in a case where the main player who is immediately ahead of the owner player is owner player him/herself and the owner player is the only main player, the play determining unit 302 returns a result that now is the owner player's turn (step S706) and terminates the present process.

On the other hand, in a case where x≠q is satisfied (step S705; No), there exists another main player than the owner player. Since the main players play the game in step with each other, the stages they have reached should be the same or may be different but only by one stage.

Since the rule that determines the play order explained here sets out that the plays should be made in the order of the player numbers, the stages they have reached are in any of the following three relationships.

(1) r(q)>r(x) meaning that the main player "q" immediately ahead of the owner player has reached a further stage than the owner player "x" has reached.

(2) r(q)=r(x) meaning that the main player "q" immediately ahead of the owner player and the owner player "x" have reached the same stage, (3) r(q)<r(x) meaning that the owner player "x" has reached a further stage than the main player "q" immediately ahead of the owner player has reached.

The owner player's turn to play comes when any of the followings is satisfied.

(i) when q<x and r(q)>r(x) are both satisfied: the player "q" who is immediately ahead of the owner player is ahead of the owner player "x" in the play order and also has reached further.

(ii) when q>x and r(q)=r(x) are both satisfied: the player "q" who is immediately ahead of the owner player is later than the owner player "x" in the play order and has reached the same stage, i.e., the owner player "x" is the player to play earliest of the main players while the player "q" who is immediately ahead of the owner player is the player to play last among the main players, and all the main players have reached the same stage.

Hence, the play determining unit 302 checks whether any of the conditions (i) and (ii) is satisfied or not (step S707).

If so (step S707; Yes), the play determining unit 302 returns a result that now is the owner player's turn (step S708), and terminates the present process.

If not (step S707; No), the play determining unit 302 returns a result that now is not the owner player's turn (step S709), and terminates the present process.

Some rules may allow that the player numbers and the play order do not coincide. In such a case, an operation m(•) for calculating the play order of the player number of a main player is devised. That is, the play order among the main players of the player having the player number "x" is the m(x)-th. Such an operation is defined by the rule of each game, and it is possible to realize a quick search by storing "x" as the index of an array and m(x) as its element. Further, the number M of the main players should be counted beforehand.

Then, at step S703, the play determining unit 302 determines whether

D[q]=0 and [m(x)−m(q)] mod M=1 are both satisfied at the same time. That is, the play determining unit 302 determines whether "q" is a main player and at the same time the order m(x) of the player "x" is greater by only 1 than the order m(x) of the player "q".

In a case where "x" is the only main player, the play determining unit 302 should complete the repetition of steps S701 to S704 without getting out of the repetition at step S703, which means that this repetition results in q=x.

The conditions at step S707 may be changed to (i) m(q)<m(x) and r(q)>r(x) are both satisfied, or (ii) m(q)>m(x) and r(q)=r(x) are both satisfied.

Hence, when the above play condition (a) or (b) is satisfied is when there comes the turn for the owner player assigned to the terminal device 202 concerned to play. Hence, the CPU 101 functions as the play determining unit 302 in cooperation with the RAM 103.

In a case where none of the play conditions is satisfied (step S402; No), −1 is substituted for the play start time "t" and the flow goes to step S431.

On the other hand, a play condition is satisfied (step S402; Yes), it is determined whether or not the play start time "t" is a negative value or not (step S404), and if negative (step S404; Yes), the current time is substituted for the play start time "t" (step S405). It is possible to turn the current time value to positive by using, as the current time, the number of times a timer interrupt has occurred since the power of the information processing device 100 was turned on or the number counted by a real time clock provided in the information processing device 100 (this count number is typically the number of seconds representing the time period that has passed since 0 o'clock, 0 minute, and 0 second on Jan. 1, 1970).

Then, the CPU 101 acquires the status of an entry to the controller 105 (step S406). The entry status may be the status of whether any button on the controller 105 is pressed or released, or measurements of a location/direction/attitude sensor, an accelerometer, an angular accelerometer, etc.

If the play start time is not a negative value (step S404; No), the CPU 101 goes straight to step S406.

Then, the CPU 101 identifies the classification of an instruction entry based on the entry status at the controller 105 (step S407). Instruction entries may be classified into:

(1) an operation entry entered by the player "x" by operating the controller 105 for clearing a stage r(x)+1 that has not yet been cleared; and (2) an abort entry entered by the player "x" by operating the controller 105 for leaving the game in the middle, which will be described later in detail.

The device that receives an entry status may be the game controller 105 as described above, or a keyboard, a mouse, a joystick, a foot switch, or the like. Alternatively, three-dimensional location, direction and attitude information of the controller 105 may be used as an operation entry. For example, in a case where the controller 105 is mounted with an accelerometer or in a case where the location or attitude of the controller 105 can be measured based on the time or phase difference required for an infrared ray or an ultrasonic wave to reach the controller 105, an action of moving the controller 105 around is associated with an action of throwing the bowl for a bowling game or with an action of swinging a golf club, and a value measured from any such action or an appropriately processed result of such a measured value is used as an operation entry. The status of whether any given button is pressed or released and the measurements of the location/direction/attitude sensor, the accelerometer, the angular accelerometer, etc. are each assigned to any of the classifications of the entry statuses.

Further, a predetermined instruction entry may be triggered when a certain entry status successively occurs. For example, a repetitive operation of pressing and releasing some predetermined buttons in a predetermined order may be associated with an instruction for a predetermined attack, or the location or attitude of the controller 105 when a button is pressed may be associated with a click of a mouse to bring up a menu on the screen, from which any item may be selected, which is associated with an instruction for a predetermined item.

Thus, in some cases, only one entry status such as pressing of a button can tell the classification of an instruction entry, while in other cases, as in the case of the above successive pressing and the mouse, entry statuses need to be recorded for the classification of some instruction entry to be known. Such associations may be appropriately changed according to the kinds of the games, the degree of player's experience, setting, etc.

Hence, the controller 105 functions as the operation entry unit 303 in cooperation with the CPU 101.

In a case where the instruction entry from the controller 105 is an operation entry from the owner player that is given for the stage r(x)+1 (step S407; operation entry), i.e., in a case where this stage is the first stage in the order of playing stages, among the stages that have not been cleared by the owner player, the present terminal device 202 has to make this operation entry be shared between itself and the other terminal devices 202.

Hence, the CPU 101 generates an operation notification packet including the following information in the RAM 103 (step S408).

(a) the player number "x" of the owner player (b) the operation entry from the owner player acquired at step S406

(c) a value obtained by subtracting the play start time "t" from the current time, i.e., a period of time that has elapsed since the owner player's turn came.

Then, the CPU 101 sends the operation notification packet to the other terminal devices 202 via the NIC 109 (step S409). Hence, the CPU 101 functions as the operation sending unit 304 in cooperation with the RAM 103 and the NIC 109.

Then, the CPU 101 determines whether or not the operation entry satisfies a clearing condition for clearing the stage r(x)+1 (step S410).

A clearing condition is a condition required for climbing up the stages of each game. In the bowling case, a frame is cleared when a player delivers one shot that makes a strike or delivers two shots. In a darts math case, a stage is cleared when a player plays one throw (three shots).

In a golf game, it is typical to declare that a stage is cleared when the ball drops in a cup. However, it is also possible to divide the game into more small stages by declaring that a stage is cleared when the ball gets on the green or by declaring that a stage is cleared when the ball drops in the cup on the green.

Whether a clearing condition is satisfied or not may be determined based on only a detected current status of the controller 105, or status records of the controller 105 as described above. In the latter case, records of operation entries need to be temporarily stored in the RAM 103 or it is necessary to keep temporal track of to what degree a predetermined pattern is fulfilled by operation entries.

In a case where the clearing condition is satisfied (step S410; Yes), the CPU 101 updates the stage information by storing in the storage unit 301 information that the owner player has cleared the stage r(x)+1, which is the first in the order of playing stages among the stages that have not been cleared by the owner player "x", i.e., by performing C[x, r(x)+1]←1 (step S411), and goes to step S412. In a case where the clearing condition is not satisfied (step S410; No), the CPU 101 goes straight to step S412.

By this process, when the owner player clears a given stage, he/she is promoted to the next stage.

On the other hand, in a case where the instruction entry from the controller 105 is an abort entry (step S407; abort entry), the CPU 101 performs D[x]←1 to store in the storage unit 301 information that the owner player "x" is delayed (step S452).

Next, the CPU 101 generates an abort notification packet that includes information indicating the player number "x" of the owner player in the RAM 103 (step S453).

Then, the CPU 101 sends the abort notification packet to the other terminal devices 202 via the NIC 109 (step S454), and goes to step S412.

Hence, the controller 105 functions as the abort entry unit 311. The CPU 101 functions as the abort determining unit 308 in cooperation with the controller 105. Further, the CPU 101 functions as the abort sending unit 309 in cooperation with the RAM 103 and the NIC 109.

In a case where step S407 turns out that the instruction entry is neither an operation entry nor an abort entry, the CPU 101 may perform a pertinent process (unillustrated) before going to step S412.

Then, the CPU 101 determines whether or not a packet from any other terminal device 202 has arrived at the NIC 109 (step S412). In a case where any has arrived (step S412; Yes), the CPU 101 repeats the following process for each of the packets that have arrived (steps S413 to S417).

First, the CPU 101 identifies the classification of the packet (step S414). Packet classifications include at least the followings.

(1) an operation notification packet: generated at step S408 and sent thereto at step S409 in the process performed by any other terminal device 202.

(2) an abort notification packet: generated at step S453 and sent thereto at step S454 in the process performed by any other terminal device 202.

Packets of any other classifications may be appropriately prepared and processes corresponding to these packets may be added. In a case where the packet that has arrived is an operation notification packet (step S414; operation notification), the CPU 101 determines, using similar determination criteria to those used at step S410, whether or not any other player "p" satisfies the clearing condition of the stage r(p)+1, by referring to:

(a) the player number "p" of the any other player;

(b) the operation entry given by the any other player "p"; and (c) the period of time that has elapsed since a play turn came to the any other player "p", which are stored in the operation notification packet, in order to check the operation entry given by the any other player "p" or a record of the operation entry that would be stored in the RAM 103 if a rule set out that a record of an operation entry specified in an operation notification packet from any other player "p" should be stored (step S415).

The elapse time included in the operation notification packet is used as a sorting key for rearranging records of operation inputs given by more than one other players "p" into a proper order in a case where their packets have arrived in a wrong order.

In a case where the clearing condition is satisfied (step S415; Yes), the CPU 101 updates the stage information by storing in the storage unit 301 information that the any other player "p" has cleared the stage r(p)+1, which is the first stage in the order of playing stages among stages that have not been cleared by the any other player "p", i.e., by performing C[p, r(p)+1]←1 (step S416), and goes to step S417. By this process, when the any other player clears a given process, he/she is promoted to the next stage.

Hence, the NIC 109 functions as the operation receiving unit 305 under the control of the CPU 101.

The CPU 101 functions as the stage updating unit 306 in cooperation with the RAM 103 and the NIC 109.

As can be seen, the present embodiment progresses the game not mainly based on a so-called server-client system, but by placing every terminal device 202 on an equal footing. Success or failure of an operation entry can be determined by every terminal device 202 since they together realize a game. Therefore, all the terminal devices 202 process operation entries of all the players to determine whether or not each of all the players can go to the next stage.

Accordingly, it is possible to prevent cheating actions to a possible degree, by checking whether the determination results of the respective terminal devices 202 coincide.

On the other hand, in a case where the packet is an abort notification packet (step S414; abort notification), the CPU 101 stores in the storage unit 301 information that this aborting player is delayed by performing D[p]←1 by referring to the player number "p" of the aborting player stored in the abort notification packet (step S462), and goes to step S417.

Hence, the NIC 109 functions as the abort receiving unit 310.

The CPU 101 repeats the above for each of the packets that have arrived (step S417), and updates the delay information as follows upon completing the repetition.

First, as described above, the CPU 101 updates the maximum stage number "z", which indicates the stage up to which all the main players have cleared (step S418).

Then, the CPU 101 repeats the following process for each value of "p"=0, 1, . . . , P−1 in this order (step S419). That is, the CPU 101 determines whether or not D(p)=1 is satisfied or not (step S420).

In a case where it is satisfied (step S420; Yes), i.e., in a case where the player "p" concerned is a sub player, the CPU 101 determines whether or not z=r(p) is satisfied or not (step S421), i.e., whether the stage cleared by the main players and the stage cleared by this sub player "p" are the same.

In a case where they are the same (step S421; Yes), the CPU 101 updates the delay information by performing D(p)←0, as the sub player "p" has caught up with the main players (step S423).

Then, the CPU 101 updates "p" to its next value and repeats the process from step S419 (step S424).

Hence, the CPU 101 functions as the delay updating unit 307 in cooperation with the RAM 103 and the NIC 109.

Then, the CPU 101 generates an image that shows the way the player is doing his/her play based on the operation entry of the owner player "x" and, if any, an operation entry of any other player stored in the RAM 103, such that the image matches the current time (step S425).

This image is typically a moving image that changes, as time goes by, the posture of the virtual character operated by each player. However, this image may simply show the current status of each player stored in the storage unit 301, since the player's status stored in the storage unit 301 is updated based on an operation entry of each player as described above.

For generating a moving image of a virtual character, it is typical to bend, stretch, or gather up a component of a joint or a muscle of the character based on an operation entry of a player. Techniques used in various games can be applied to such character steering by a player.

The operation entry entered here is given by the owner player "x" and the operation entry specified in the received operation notification is given by any other player. In games of golf, darts, bowling, etc., it is one great pleasure to watch other players playing, not like just playing for oneself.

Hence, the image may be engineered by a technique of providing a size difference to the images of characters to make it clear whether each character is worth noting and emphatically display a notable character.

That is, in a case where the owner player "x" is a sub player, i.e., in a case where D[x]=1 is satisfied, the information of the owner player "x" is emphasized more than the information of the other players.

This is because the situation is that the owner player "x" is delayed so it is assumed that he/she is playing in a stage different from the stage played by the main players who are going ahead, and the owner player "x" is playing in the stage alone, so the play of the owner player "x" is emphasized more than the other players (the main players and the other sub players). As will be described later, the present embodiment uses an emphasizing method of enlarging the area in which the image is displayed and displaying the image in the center of the screen.

On the other hand, in a case where the owner player "x" is a main player, i.e., in a case where D[x]=0 is satisfied, the information of the main players including the owner player "x" is emphasized more than the information of the sub players.

This is because the situation is that the owner player "x" is playing as a main player and the plays of the other main players, needless to say about the play of the owner player, are important because the owner player "x" is playing in the same stage as the other main players, so the plays of the main players, one of who is the owner player, are emphasized more than the sub players.

Figure 9:
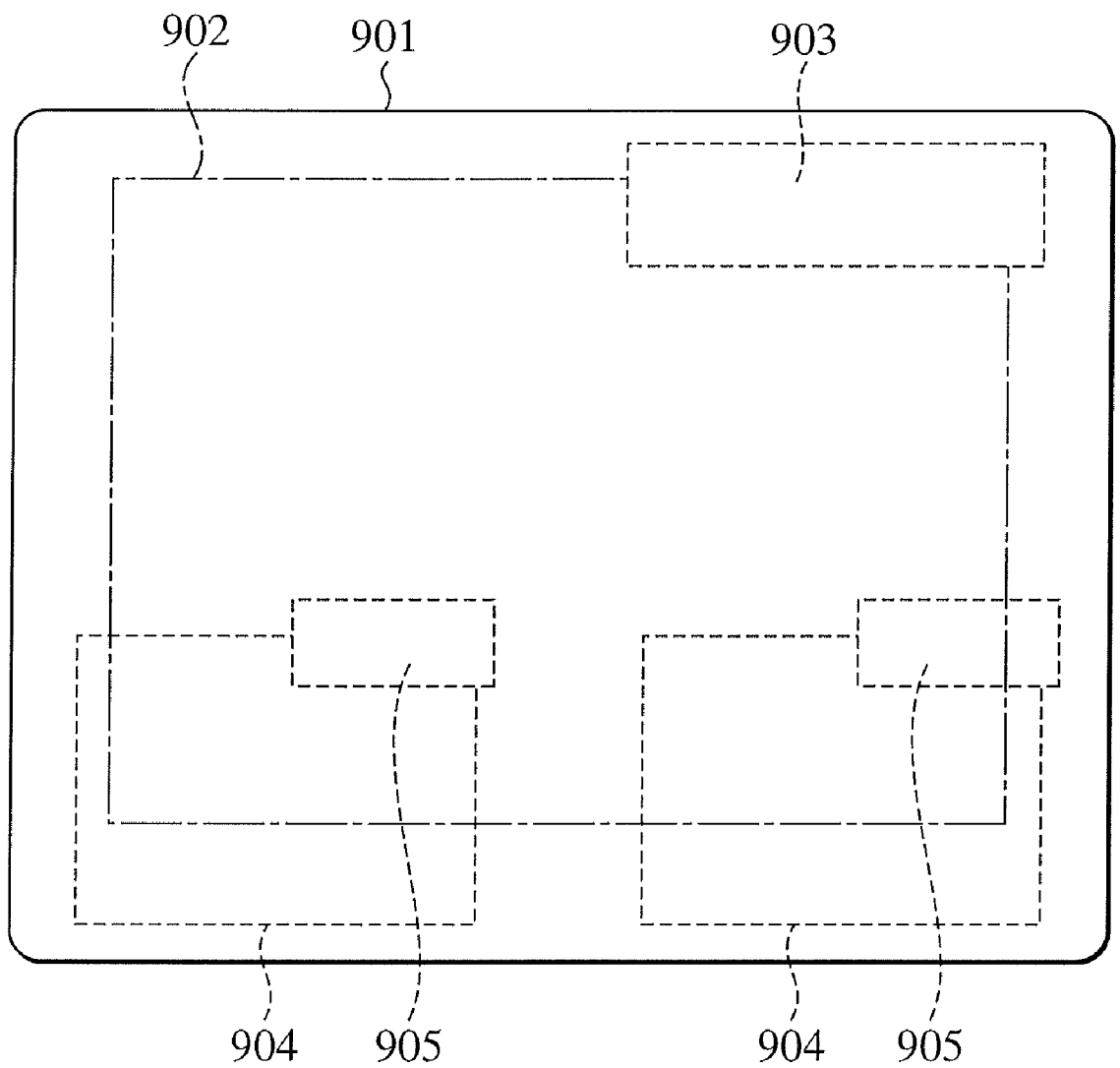
FIG. 9 is an explanatory diagram showing display areas in a generated image.

FIG. 9 is an explanatory diagram showing display areas in a generated image. The following explanation will be given with reference to FIG. 9.

The screen 901 includes a character emphatic display area 902, a player information emphatic display area 903, two character normal display areas 904 and two player information normal display areas 905.

The information of the player who should be emphatically displayed is displayed in the player information emphatic display area 903, while a moving image of the character that is based on an operation entry given by that player is displayed in the character emphatic display area 902. These are allocated in the center of the screen 901 and occupy a large area.

Information of any other player is displayed in each player information normal display area 905, while a moving image of the character that is based on an operation entry given by that player is displayed in each character normal display area 904. These are allocated in the lower section of the screen 901 and occupy a small area.

These displays are superimposed on the player information emphatic display area 903 and the character emphatic display area 902.

As shown in the drawing, the player information emphatic display area 903 is larger than the player information normal display areas 905 and the character emphatic display area 902 is larger than the character normal display areas 904.

In a case where there exists no other player, i.e., in a case where the players who are participating in the game are all main players, or alternatively, in a case where there is one other player, no information will be displayed in one or both of the player information normal display areas 905 and in one or both of the character normal display areas 904 to let the displayed contents in the player information emphatic display area 903 and the character emphatic display area 902 be seen directly.

In a case where the owner player is a main player and there is one delayed player, the delayed player is displayed in one of the character normal display areas 904. In a case where there are two delayed players, these delayed players are displayed in the character normal display areas 904 respectively.

On the other hand, in a case where the owner character is a delayed player, a main player is displayed in one of the character normal display areas 904. In a case where there is another delayed player than the owner player, this delayed player is displayed in the other of the character normal display areas 904.

By making a difference between images about whether they are emphasized or not based on the size of the areas in which the images are displayed, it is possible to display, in an overlaying manner, a situation of, for example, a golf tournament hooked up on a television broadcast, where a plurality of notable players might be playing in different holes.

Then, the CPU 101 controls the image processing unit 107 to transfer the generated image at an appropriate image transfer timing (for example, immediately after a vertical synchronization interrupt occurs) and display the image on the monitor (step S426).

Hence, the CPU 101 functions as the display unit 312 in cooperation with the RAM 103 and the image processing unit 107.

Then, the CPU 101 determines whether or not the game is finished, i.e., whether r(p)=S−1 is satisfied for all values of "p"=0, 1, . . . , P−1 (step S427). In FIG. 5, a universal quantifier "∀" in logic is used to represent this effect.

In a case where the game is finished (step S427; Yes), the CPU 101 terminates this process. In a case where the game is not finished (step S427; No), the CPU 101 returns to step S402.

In a case where the play conditions are not satisfied (step S402; No), after going through step S403, the CPU 101 acquires an entry status at the controller 105 (step S431) and identifies the classification of an instruction entry classification corresponding to the entry status (step S432).

In a case where the instruction entry is an abort entry (step S432; abort entry), the CPU 101 goes to step S452. In a case where the instruction entry is any other than an abort entry (step S432; other), the CPU 101 goes to step S412.

This embodiment is a manner for expressly entering into the terminal, information that the player is going to leave the game for a guest arrival or a nature's call. An abort entry may be established by pressing of a predetermined switch or selection of a predetermined menu item.

This embodiment shifts a player, who leaves the game by expressing to do so, to a delay status to prevent the game itself from being delayed, and being combined with the above configuration, enables the game to be progressed by all the participants as much as possible by arranging for the delaying sub player to be able to catch up with the non-delaying main players.

According to the present embodiment, the play determining unit 302 performs the determination when the game is started, when the delay information is updated, or when an operation notification is received.

For example, the golf rule sets out nothing about hitting a tee shot at the starting point of a hole (where the ball is teed up), but provides that after the tee shot, those who are farther away from the hole should play first. Therefore, each time the players hit a shot, it is necessary to decide who is the next player.

An appropriate rule may be set for teeing such that each player's turn is uniquely determined. Such a rule may be to determine the order by a lottery, random numbers, etc. or to arrange players with worse past achievements first in the order, etc. before a game is started.

Hence, this embodiment can deal with a game rule in which the play order of the players is neither alternate nor in a predetermined cyclic pattern.

The control flow may be changed such that the play determining unit 302 performs the determination when a game is started, when the delay information is updated, or when the stage information is updated.

For example, darts players alternate their play when each finishes one throw (three arrows). Bowling players alternate their play when each finishes one frame (one shot with a strike, or two shots). Hence, where a cyclic order is set among a plurality of players before a game is started, and one throw or one frame is regarded as a "stage", the timing to determine who is the next player may be when the stage information is updated.

With this configuration, it is possible to deal with a game rule in which the play order of the players is alternate or in a predetermined cyclic pattern.

According to this embodiment, an operation entry given after an abort entry causes the abort of the owner player "x" to be immediately canceled. It is also possible to employ an embodiment in which a predetermined button on the controller 105 is set for giving a resume entry when it is operated, so that after a resume entry is given, an operation entry is effective.

Aside from the above, according to this embodiment, an abort entry triggers a delay status of the owner player "x", but any other event may trigger a delay of the owner player "x".

For example, this may be embodied by a method of performing $D(x) \rightarrow 1$ in a case where the owner player "x", whose play condition has just been determined as being satisfied, fails, for a certain continuous period of time thereafter, to give an instruction entry that entails the determination of whether it satisfies a clearing condition.

For example, in darts, bowling or golf games in which the direction in which or the speed at which an arrow is thrown, the direction in which or the speed at which the bowl is delivered, or the direction in which or the speed at which a club is swung is entered based on the direction, the location, or the speed of the controller, and an arrow is launched, the bowl is thrown, or some impact is produced at the instant a predetermined button is pressed, if a predetermined threshold period of time or longer elapses after a given player's turn comes until the predetermined button is pressed, this may be considered as an abort of the play.

In this case too, the abort is notified by means of an abort notification packet to the other terminal devices 202. Therefore, the game progresses smoothly. Further, unlike [Non-Patent Literature 1], the present embodiment turns the owner player into a sub player when he/she fails to keep a time limit to automatically bring him/her under a status under which he/she progresses the game independently from the main players.

Further, the present embodiment shifts a player, who aborts the game in silence, to a delay status in order to prevent the game itself from being delayed, and being combined with the above configuration, enables the game to be progressed by all the participants as much as possible by arranging for the delaying sub player to be able to catch up with the non-delaying main players.

Furthermore, when a comparison between a current number of sub players and that of main players turns out that the former is larger than the latter or when there are only two main players left, the control may be changed not to allow an abort when an abort entry is given. This is because since each sub player tries to catch up with the main players by him/herself, he/she can succeed in catching up with them with a significantly high probability if there are at least two main players.

That having been said, even if all but only one player who remains as a main player become sub players, a leading success of any one of the sub players in catching up with the one main player may highly probably bring the sub players into avalanche-like successes in catching up thereafter. Therefore, it is not necessarily requisite to set such a limit.

INDUSTRIAL APPLICABILITY

As explained above, according to the present invention, it is possible to provide a game system and a game control method that are suitable for making a play order of players to comply with a predetermined rule as much as possible but nevertheless allowing, with an appropriate measure, any player who has fallen behind in play to participate in the game, a computer-readable information recording medium that stores a program for realizing these on a computer, and the program.

The present application claims priority based on Japanese Patent Application No. 2007-43158, the content of which is incorporated herein if laws of the designated states permit.

The invention claimed is:

1. A game system, comprising:
a plurality of terminal devices each of which is assigned any of a plurality of players, each of who progresses a game by clearing a plurality of stages in an order, a predetermined rule that uniquely determines a play order of the plurality of players being shared by the plurality of terminal devices, wherein each of the plurality of terminal devices includes:
a storage unit that stores, for all of the plurality of players, delay information indicating whether each player is delayed or not, and stage information indicating whether each player has cleared each of the plurality of stages or not;
a play determining unit that determines whether a play condition of an owner player assigned to the terminal device is satisfied or not, where the play condition is:
(a) the owner player indicated in the stored delay information as being delayed is a sub player, so the owner player has not cleared some of stages that have been cleared by all such players who are indicated in the stored delay information as not being delayed, or
(b) the owner player indicated in the stored delay information as not being delayed is a main player, and the owner player is first in the play order when the shared predetermined rule is applied to all main players;
an operation entry unit that, in a case where the play condition of the owner player is satisfied, accepts an operation entry from the owner player, the operation entry being given for a first stage in the order among stages that have not been cleared by the owner player;
an operation sending unit that sends an operation notification that specifies the accepted operation entry to the other terminal devices of the plurality of terminal devices the operation receiving unit that receives an operation notification that is sent from any other terminal device of the plurality of terminal devices;
a stage updating unit that updates the stage information stored in the storage unit, where (m) in a case where a clearing condition of the first stage in the order among the stages that have not been cleared by the owner player is satisfied by the accepted operation entry, the stage updating unit stores, in the storage unit, information that the owner player has cleared the first stage in the order among the stages that have not been cleared by the owner player, and (n) in a case where a clearing condition of a first stage in the order among stages that have not been cleared by any other player assigned to a terminal device that has sent the received operation notification is satisfied by an operation entry specified in the received operation notification, the stage updating unit stores, in the storage unit, information that the any other player has cleared the first stage in the order among the stages that have not been cleared by the any other player; and
a delay updating unit that updates the delay information stored in the storage unit, where (p) in a case where, for each sub player, a stage up to which the sub player has cleared and a stage up to which all the main players have cleared are the same, the delay updating unit stores, in the storage unit, information that the sub player is not delayed.

2. The game system according to claim 1,
wherein each of the plurality of terminal devices further includes:
an abort determining unit that determines whether or not the owner player has performed an abort process;
an abort sending unit that, in a case where the abort process has been performed, sends an abort notification to the other terminal devices of the plurality of terminal devices; and an abort receiving unit that receives an abort notification that is sent from any other terminal device of the plurality of terminal devices, and wherein (q) in the case where the abort process has been performed, the delay updating unit stores, in the storage unit, information that the owner player is delayed, and (r) in a case where the abort notification is received, the delay updating unit stores, in the storage unit, information that a player assigned to a terminal device that has sent the abort notification is delayed.

3. The game system according to claim 2, further comprising an abort entry unit that accepts an abort entry from the owner player, wherein the abort determining unit determines that the owner player has performed the abort process, in a case where the abort entry from the owner player is accepted.

4. The game system according to claim 2, wherein the abort determining unit determines that the owner player has performed the abort process, in a case where the play condition of the owner player is satisfied, and the owner player does not give an operation entry within a predetermined period of time for the first stage in the order among the stages that have not been cleared by the owner player.

5. The game system according to claim 1, wherein the play determining unit performs its determination when a game is started, when the delay information is updated, or when an operation notification is received.

6. The game system according to claim 1, wherein the play determining unit performs its determination when a game is started, when the delay information is updated, or when the stage information is updated.

7. The game system according to claim 1, wherein each of the plurality of terminals further includes a display unit that generates, based on the accepted operation entry or based on the operation entry specified in the received operation notification, an image that is associated with the operation entry, and displays the generated image together with information about the player who has given the operation entry.

8. The game system according to claim 7, wherein (x) in a case where the owner player is a sub player, the display unit displays information about the owner player more emphatically than information about any other player, and (y) in a case where the owner player is a main player, the display unit displays information about a main player more emphatically than information about a sub player.

9. The game system according to claim 8, wherein the display unit displays an image associated with an operation entry given by a player who should be displayed emphatically in a wider area than an area in which an image associated with an operation entry given by any other player is displayed.

10. A game control method for realizing a game that uses a plurality of terminal devices, each of which is assigned any of a plurality of players, each of who progresses the game by clearing a plurality of stages in an order, a predetermined rule that uniquely determines a play order of the plurality of players being shared by the plurality of terminal devices, a storage unit being provided for each of the plurality of terminal devices, the storage unit storing, for all of the plurality of players, delay information indicating whether each player is delayed or not, and stage information indicating whether each player has cleared each of the plurality of stages or not, the method comprising in each of the plurality of terminal devices:

a play determining step of determining whether a play condition of an owner player assigned to the terminal device is satisfied or not, where the play condition is:

(a) the owner player indicated in the stored delay information as being delayed is a sub player, so the owner player has not cleared some of stages that have been cleared by all such players who are indicated in the stored delay information as not being delayed, or (b) the owner player indicated in the stored delay information as not being delayed is a main player, and the owner player is first in the play order when the shared predetermined rule is applied to all main players;

an operation entry step of, in a case where the play condition of the owner player is satisfied, accepting an operation entry from the owner player, the operation entry being given for a first stage in the order among stages that have not been cleared by the owner player;

an operation sending step of sending an operation notification that specifies the accepted operation entry to the other terminal devices of the plurality of terminal devices;

an operation receiving step of receiving an operation notification that is sent from any other terminal device of the plurality of terminal devices;

a stage updating step of updating the stage information stored in the storage unit, where (m) in a case where a clearing condition of the first stage in the order among the stages that have not been cleared by the owner player is satisfied by the accepted operation entry, information that the owner player has cleared the first stage in the order among the stages that have not been cleared by the owner player is stored in the storage unit, and (n) in a case where a clearing condition of a first stage in the order among stages that have not been cleared by any other player assigned to a terminal device that has sent the received operation notification is satisfied by an operation entry specified in the received operation notification, information that the any other player has cleared the first stage in the order among the stages that have not been cleared by the any other player is stored in the storage unit;

a delay updating step of updating the delay information stored in the storage unit, where (p) in a case where, for each sub player, a state up to which the sub player has cleared and a stage up to which all the main players have cleared are the same, information that the sub player is not delayed is stored in the storage unit.

11. A non-transitory computer-readable information recording medium storing a program that controls a computer to function as any one of a plurality of terminal devices used in a game, each of the plurality of terminal devices being assigned any of a plurality of players, each of who progresses the game by clearing a plurality of stages in an order, a predetermined rule that uniquely determines a play order of the plurality of players being shared by the plurality of terminal devices, the program controlling the computer to function as:

a storage unit that stores, for all of the plurality of players, delay information indicating whether each player is delayed or not, and stage information indicating whether each player has cleared each of the plurality of stages or not;

a play determining unit that determines whether a play condition of an owner player assigned to the terminal device is satisfied or not, where the play condition is:

(a) the owner player indicated in the stored delay information as being delayed is a sub player delayed, so the owner player has not cleared some of stages that have been cleared by all such players who are indicated in the stored delay information as not being delayed, or (b) the owner player indicated in the stored delay information as not being delayed is a main player, and the owner player is first in the play order when the shared predetermined rule is applied to all main players;

an operation entry unit that, in a case where the play condition of the owner player is satisfied, accepts an operation entry from the owner player, the operation entry being given for a first stage in the order among stages that have not been cleared by the owner player;

an operation sending unit that sends an operation notification that specifies the accepted operation entry to the other terminal devices of the plurality of terminal devices;

an operation receiving unit that receives an operation notification that is sent from any other terminal device of the plurality of terminal devices;

a stage updating unit that updates the stage information stored in the storage unit, where (m) in a case where a clearing condition of the first stage in the order among the stages that have not been cleared by the owner player is satisfied by the accepted operation entry, the stage updating unit stores, in the storage unit, information that the owner player has cleared the first stage in the order among the stages that have not been cleared by the owner player, and (n) in a case where a clearing condition of a first stage in the order among stages that have not been cleared by any other player assigned to a terminal device that has sent the received operation notification is satisfied by an operation entry specified in the received operation notification, the stage updating unit stores, in the storage unit, information that the any other player has cleared the first stage in the order among the stages that have not been cleared by the any other player; and a delay updating unit that updates the delay information stored in the storage unit, where (p) in a case where, for each sub player, a stage up to which the sub player has cleared and a stage up to which all the main players have cleared are the same, the delay updating unit stores, in the storage unit, information that the sub player is not delayed.

* * * * *